US005604031A

United States Patent [19]

Yamamoto et al.

[11] Patent Number: 5,604,031

[45] Date of Patent: Feb. 18, 1997

[54] ELECTRICALLY CONDUCTIVE ROLL WHOSE BASE LAYER IS FORMED OF ION-CONDUCTIVE ELASTIC MATERIAL

[75] Inventors: Takafumi Yamamoto, Kasugai; Sumio Oinuma, Tajimi; Kazutoshi Soumiya, Komaki; Saburou Hayashi, Kasugai; Hiroyasu Kato, Bisai, all of Japan

[73] Assignee: Tokai Rubber Industries, Ltd., Japan

[21] Appl. No.: 261,922

[22] Filed: Jun. 17, 1994

[30] Foreign Application Priority Data

Jun. 24, 1993 [JP] Japan .................................... 5-180619

[51] Int. Cl.$^6$ ........................... B32B 15/08; B32B 27/00; B32B 27/08

[52] U.S. Cl. .......................... 428/335; 428/337; 428/461; 428/475.5; 428/475.8; 428/500; 428/515; 428/906

[58] Field of Search .................................... 428/906, 461, 428/515, 500, 332, 336, 475.5, 475.8, 335, 337; 355/277, 290

[56] References Cited

U.S. PATENT DOCUMENTS 4,062,812 12/1977 Safford et al. .......................... 252/500

5,359,395 10/1994 Shimura et al. ........................ 355/219

FOREIGN PATENT DOCUMENTS 0308185 3/1989 European Pat. Off. .

0329366 8/1989 European Pat. Off. .

0417801 3/1991 European Pat. Off. .

2-311868 12/1990 Japan .

2-311867 12/1990 Japan .

5-88509 4/1993 Japan .

*Primary Examiner*—Paul J. Thibodeau

*Assistant Examiner*—Stephen Sand

*Attorney, Agent, or Firm*—Parkhurst, Wendel & Burr, LLP

[57] ABSTRACT

An electrically conductive roll is disclosed, which includes: a center shaft; a base layer formed on an outer circumferential surface of the center shaft and including an elastic material as a major component and an ion-conductive material, the base layer having a volume resistivity of $10^6$–$10^9$ Ωcm; an electrode layer formed on an outer surface of the base layer and including a synthetic resin material as a major component and an electron-conductive material, the electrode layer having a volume resistivity of not more than $10^3$ Ωcm; a resistance adjusting layer formed on an outer surface of the electrode layer; and a protective layer formed on an outer surface of the resistance adjusting layer.

15 Claims, 1 Drawing Sheet

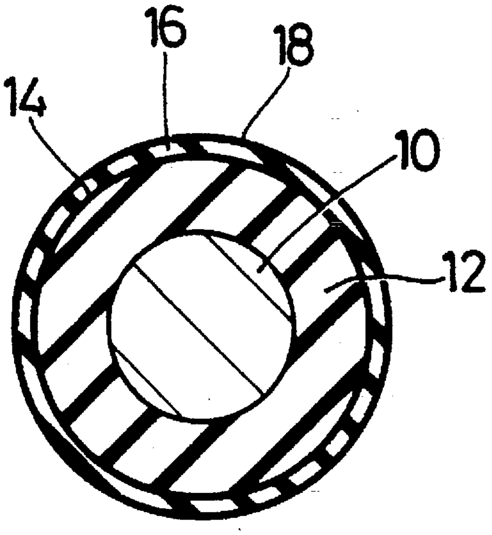
16
18
14
10
12

ELECTRICALLY CONDUCTIVE ROLL WHOSE BASE LAYER IS FORMED OF ION-CONDUCTIVE ELASTIC MATERIAL

BACKGROUND OF THE INVENTION

1. Field of the Invention

The present invention relates to an electrically conductive roll, such as a charging roll, a transfer roll and a cleaning roll, for use in electrophotographic copying machines, printers or the like, which conductive roll is required to exhibit low hardness or high flexibility, and electrical conductivity.

2. Discussion of the Related Art

An electrically conductive roll such as a charging roll, a transfer roll and a cleaning roll to be used in electrophotographic copying machines and printers is generally required to exhibit low hardness or high flexibility, and electrical conductivity. To meet this requirement, there has been conventionally employed a conductive roll as shown in the drawing, wherein a base layer consisting of an electrically conductive elastic body having low hardness and a predetermined thickness is formed on the outer circumferential surface of a suitable center shaft (metal core). On the outer surface of the base layer, there are formed by coating the following layers in the order of description: an electrode layer having a relatively small thickness; a dielectric layer (resistance adjusting layer); and a protective layer. In the case of a charging roll with a center shaft (10) having a diameter of about 6 mm, for example, a base layer (12) which has a thickness of about 3 mm is formed on the outer surface of the center shaft (10). Then, on the outer surface of the base layer (12), there are formed an electrode layer (14), a dielectric layer (16), and a protective layer (18) in the order of description which have a thickness of about 10 μm, 160 μm, and 10 μm, respectively.

The base layer of the conventional conductive roll as described above is formed of an electrically conductive elastic material prepared by adding an electron-conductive material, such as a carbon black or metal powder, to an elastic material (major component) such as EPDM (ethylene propylene diene monomer), SBR (styrene-butadiene rubber), or NR (natural rubber), so that the prepared mixture is adjusted to have a volume resistivity of not more than $\mathbf{10^3}$ Ωcm. To the thus prepared mixture, there is further added a relatively large amount of softener such as a process oil or a liquid polymer, so that the mixture has a JIS A type (Japanese Industrial Standards) hardness value (Hs) as low as 30°. Thus, the material for the base layer prepared as described above provides the conductive roll with low hardness (high flexibility) and high electrical conductivity.

The electrode layer formed on the outer surface of the base layer consists of a material which is prepared by mixing carbon black with a synthetic resin such an nylon, so as to have a volume resistivity of around $10^2$ Ωcm. The electrode layer assures resistance uniformity of the conductive roll, and serves as a barrier for inhibiting the softener contained in the material of the base layer from migrating into the dielectric and protective layers, and consequently onto the outer surface of the roll. The dielectric layer formed on the outer surface of the electrode layer is formed of a material including epichlorohydrin rubber as a major constituent, for instance. The material is formulated to have a volume resistivity of around $10^7$ Ωcm, so that the electrode layer formed of the thus prepared material is capable of adjusting the resistance of the conductive roll and preventing leakage of an electric current therethrough. The protective layer provided on the dielectric layer is formed of a material prepared by mixing an electrically conductive powder of a solid solution of antimony oxide and stannic oxide, so as to have a volume resistivity of around $10^7$ Ωcm. The protective layer formed of the thus prepared material prevents the conductive roll from sticking to a photosensitive or photoconductive body such as a photoconductive drum used in a photocopying machine, for instance.

In the conventional conductive roll as described above, however, since the base layer is formed of the electrically conductive elastic composition which includes an electron-conductive material to give the base layer having a volume resistivity of not more than $10^3$ Ωcm, the conductive roll suffers from a problem that the level of the voltage at which an abnormal electric discharge is induced is undesirably low. Accordingly, the conventional conductive roll tends to suffer from the abnormal electric discharge upon application of a relatively high voltage for reproducing an image on a copy sheet. As a result, the image reproduced by using the conventional conductive roll has a low copy quality, that is, lines undesirably appear as a part of the reproduced image in the transverse direction of the copy sheet. In the conventional conductive roll, both of the base and electrode layers have relatively low volume resistivity values. Accordingly, the resistance of the conductive roll to the dielectric breakdown (and consequent current leakage) is highly dependent on the dielectric layer in the form of a relatively thin coating layer. As a result, the dielectric layer is likely to be subject to the dielectric breakdown at its local portions having a comparatively small thickness, leading to an insufficient operating reliability of the conductive roll. Furthermore, the hardness of the conductive roll is liable to increase since the electrically conductive elastic composition which gives the base layer of the conventional conductive roll contains the electron-conductive material such as a carbon black or metal powder dispersed in the matrix of the elastic material. For assuring a suitable or desired nip between the conductive roll and the photoconductive drum when the roll is in pressed contact with the drum, the material for the base layer must unfavorably contain an excessively large amount of the softener to reduce the hardness of the conductive roll.

SUMMARY OF TEE INVENTION

The present invention has been developed in the light of the above situations. It is therefore an object of the invention to provide an electrically conductive roll which has low hardness or high flexibility, and which is substantially free from an abnormal electric discharge and dielectric breakdown, so that the roll exhibits improved operating characteristics with high stability.

The above object may be attained according to the present invention which provides an electrically conductive roll comprising: a center shaft; a base layer formed on an outer circumferential surface of the center shaft and including an elastic material as a major component and an ion-conductive material, the base layer having a volume resistivity of $10^6$–$10^9$ Ωcm; an electrode layer formed on an outer surface of the base layer and including a synthetic resin material as a major component and an electron-conductive material, the electrode layer having a volume resistivity of not more than $10^3$ Ωcm; a resistance adjusting layer formed on an outer surface of the electrode layer; and a protective layer formed on an outer surface of the resistance adjusting layer.

In the electrically conductive roll constructed according to the present invention, the base layer of the roll consists of an ion-conductive elastic material having a volume resistivity in the range of $10^6$–$10^9$ Ωcm. Thus, the base layer of the present conductive roll exhibits a higher resistivity as compared with that of the conventional base layer, and therefore, the voltage applied to the conductive roll is uniformly distributed. If the conventional elastic base layer including an electron-conductive material is formulated to have a higher resistivity, there arises a problem that the electron-conductive material is not likely to be well dispersed in the matrix of the elastic material. By contrast, the ion-conductive rubber according to the present invention is free from such a problem, and is capable of functioning as the base layer whose resistance is adequately controlled.

According to the present electrically conductive roll, the voltage applied thereto is uniformly distributed, and the level of the voltage at which an abnormal electric discharge is induced is effectively raised so that the occurrence of the abnormal electric discharge is prevented, whereby the occurrence of a dielectric breakdown within the conductive roll is advantageously avoided. Thus, the conductive roll constructed according to the present invention is capable of exhibiting improved operating characteristics with high stability. In the present conductive roll, the electrode layer having a low resistivity value is provided on the outer surface of the base layer. This arrangement permits the electric current to sufficiently flow through the electrode layer, whereby the electric current is effectively directed from the entire circumference of the roll toward the outer circumferential surface of a photoconductive or photosensitive drum which is in rolling contact with the roll, even if the electric current is not likely to flow through the base layer having a relatively high resistance value. Accordingly, the present conductive roll is capable of effectively charging the photoconductive drum owing to a sufficient amount of flow of the electric current at the contact portion between the surfaces of the conductive roll and photoconductive drum.

BRIEF DESCRIPTION OF THE DRAWINGS

The above and other objects, features and advantages of the present invention will be better understood by reading the following detailed description of a presently preferred embodiment of the invention, when considered in connection with the accompanying drawing, in which the single figure is a transverse cross-sectional view of an electrically conductive roll constructed according to the present invention.

DETAILED DESCRIPTION OF THE INVENTION

Referring to the drawing, there is shown one example of an electrically conductive roll of the present invention, which consists of: a center shaft (metal core) 10; a base layer 12 formed of an ion-conductive elastic material; an electrode layer 14 formed of an electron-conductive synthetic resin material; a resistance adjusting layer 16; and a protective layer 18.

More specifically described, the ion-conductive elastic material for the base layer 12 is obtained by mixing an ion-conductive material with a suitably selected elastic material, so that the mixture has a volume resistivity of around $10^6$–$10^9$ Ωcm. The elastic material contained as a major component of the ion-conductive elastic material which gives the base layer 12 includes at least one material suitably selected from among urethane rubber, epichlorohydrin rubber, acrylonitrile-butadiene rubber, and hydrogenated acrylonitrile-butadiene rubber, for instance. The ion-conductive material contained in the ion-conductive elastic material is selected from among quaternary ammonium salt such as trimethyloctadecyl ammonium perchlorate or benzyltrimethyl ammonium chloride, the salt having a structural charge specific anion, and perchlorate such as lithium perchlorate or potassium perchlorate, for instance. The amount of the ion-conductive material to be included in the ion-conductive elastic material for forming the base layer 12 is suitably determined depending upon a desired value of the volume resistivity. Usually, the ion-conductive material is included in an amount of 0.05–5 parts by weight per 100 parts by weight of the elastic material.

An intensive study made by the inventors of the present invention revealed that the ion-conductive elastic material obtained by mixing epichlorohydrin-ethylene oxide copolymer rubber with trimethyloctadecyl ammonium perchlorate as the ion-conductive material exhibits excellent operating characteristics, and is preferably employed as the material for the base layer of the present conductive roll.

The electron-conductive synthetic resin material which forms the electrode layer 14 is obtained by mixing a suitably selected synthetic resin with the electron-conductive material such as a carbon black or metal powder, so that the mixture provides a volume resistivity of not more than $10^3$ Ωcm. In this respect, the electron-conductive synthetic resin material conventionally used for forming the electrode layer can be employed for forming the electrode layer in the present invention. For instance, the electron-conductive synthetic resin material obtained by mixing nylon such as N-methoxymethylated nylon with carbon black is preferably employed for forming the electrode layer 14 of the present conductive roll.

There will be hereinafter described a manner of producing the conductive roll according to the present invention as shown in the drawing. Initially, the base layer 12 is formed on the outer circumferential surface of the center shaft 10 by a known method, such as molding using a mold, by using the ion-conductive elastic material or composition prepared as described above. Then, the electrode layer 14 is formed on the outer surface of the base layer 12 by a known coating method, such as dipping, by using the synthetic resin mixed with the electron-conductive material as described above. While the thickness of each layer of the conductive roll may be suitably determined depending upon the specific utility or application of the roll, it is preferred that the base and electrode layers have thickness values in the ranges of about 2–10 mm and 3–20 μm, respectively. When the roll is used as a charging roll, it is preferable that the base and electrode layers have thickness values of about 3 mm and 10 μm, respectively.

The resistance adjusting layer 16 and protective layer 18 are also formed by the known coating method, such as dipping, on the outer surface of the electrode layer 14, with respective predetermined thickness values. Described in detail, the resistance adjusting layer 16 is formed of a material similar to that for the base layer 12, and usually has a thickness of about 50–300 μm, so that the layer 16 functions to control the resistance of the conductive roll and to prevent the electric current from leaking. It is noted that the resistance adjusting layer 16 may consist of a single layer or two or more layers. On the other hand, the protective layer 18 is formed of the material obtained by mixing a powder of a solid solution of antimony oxide and stannic oxide, with a nylon-based synthetic resin, so that the material has a volume resistivity of around $10^6$ Ωcm. The protective layer 18 formed on the outer surface of the electrode layer 14 usually has a thickness in the range of about 3–10 μm, and functions to prevent the conductive roll from sticking to the outer surface of the photoconductive drum. When the roll is used as a charging roll, it is preferable that the resistance adjusting layer 16 and the protective layer 18 have thickness values of about 160 μm and 10 μm, respectively.

In the present conductive roll constructed as described above, the base layer 12 is formed of the ion-conductive elastic material having a higher resistance as compared with the conventional base layer, whereby the voltage applied to the roll is effectively distributed. Accordingly, the level of the voltage at which an abnormal electric discharge occurs is advantageously raised, and the leakage of the electric current is effectively prevented. Further, since the ion-conductive elastic material which provides the base layer 12 does not contain therein the electron-conductive material such as carbon black, the present ion-conductive elastic material is advantageous over the electron-conductive elastic material conventionally used for the base layer, in that the ion-conductive base layer exhibits sufficiently low hardness or sufficiently high flexibility, leading to significantly reduced hardness of the conductive roll as a whole, so as to provide a good nip between the conductive roll and photoconductive drum.

EXAMPLES

There will be described in detail some examples of the conductive roll constructed according to the present invention. However, it is to be understood that the invention is by no means limited to the details of the description of these examples, but may be embodied with various changes, modifications and improvements, which may occur to those skilled in the art, without departing from the scope of the invention as defined in the appended claims.

Specimen Nos. 1–3 of the ion-conductive elastic material for the base layer which contain the ion-conductive material were prepared in a manner as described below. Initially, the softener in the form of a process oil was mixed in an amount of 20 parts by weight, with 100 parts by weight of epichlorohydrin-ethylene oxide copolymer rubber. Then, there was further added trimethyloctadecyl ammonium perchlorate as the ion-conductive material in different proportions (parts by weight per 100 parts by weight of the copolymer rubber) as indicated in TABLE 1, so as to provide the specimens Nos. 1–3 having different values of volume resistivity as also shown in TABLE 1. As a comparative example, a specimen No. 4 which contains an electron-conductive material was prepared, wherein 70 parts by weight of process oil as the softener, 20 parts by weight of factice or rubber substitute, and 50 parts by weight of carbon black were mixed, per 100 parts by weight of SBR (styrene-butadiene rubber), so that the specimen No. 4 has a volume resistivity of not more than $10^3$ Ωcm. Further, specimens Nos. 5–7 of the ion-conductive elastic material for the base layer which contain the ion-conductive material were prepared in a similar way as described above with respect to the specimen Nos. 1–3. Initially, the softener in the form of a process oil was mixed in an amount of 20 parts by weight, with 100 parts by weight of epichlorohydrin-ethylene oxide copolymer rubber. Then, there was further added lithium perchlorate as the ion-conductive material in different proportions (parts by weight per 100 parts by weight of the copolymer rubber) as indicated in TABLE 1, so as to provide the specimens Nos. 5–7 having different values of volume resistivity as also shown in TABLE 1. Thereafter, various samples of the conductive roll were produced by first forming the base layer of 3 mm thickness using the thus prepared specimens, on the outer circumferential surface of a metal core (having a diameter of 6 mm) by molding.

Subsequently, respective materials for forming the electrode layer and protective layer were prepared as indicated below so as to have volume resistivity values of $10^2$ Ωcm and $10^7$ Ωcm, respectively. These materials were used to provide respective coating liquids each having a suitable viscosity. Further, the materials for forming the base layer (specimens Nos. 1–7) prepared as described above were employed to provide a coating liquid with a suitable viscosity for forming the resistance adjusting layer.

| | |
|---|---|
| Material for the electrode layer | |
| N-methoxymethylated nylon | 100 parts by weight |
| electron-conductive carbon black | 20 parts by weight |
| Material for the protective layer | |
| N-methoxymethylated nylon | 100 parts by weight |
| powder of solid solution of antimony and stannic oxides | 70 parts by weight |

Thereafter, the material for the electrode layer prepared as indicated above was applied, by a known dipping method, to the outer circumferential surface of the base layer to form a 10 μm-thick electrode layer. On the outer circumferential surface of the thus formed electrode layer, the resistance adjusting layer and protective layer were formed in this order by dipping, using the above-indicated respective materials, such that the resistance adjusting and protective layers have thickness values of 160 μm and 10 μm, respectively. In this manner, there were obtained five specimens of the conductive roll.

The thus obtained conductive rolls were actually installed as charging rolls on a printer ("LASER SHOT LBP A 404E" available from Canon Kabushiki Kaisha, Japan), and tested by measuring the level of the voltage at which an abnormal electric discharge occurs, namely, the voltage level at which a line(s) appears on a reproduced black image or the white background of the copy sheet, in the transverse direction of the sheet. The test was conducted by applying a voltage of xVp-p 150 Hz–550 V from an external power source, to each conductive roll, and the voltage at which the reproduced or printed image suffers from the transverse line(s) was measured. The results of the measurement are also indicated in TABLE 1.

TABLE 1

| Specimen No. | amount of ion-conductive material in base layer (parts by weight) | volume resistivity of base layer (Ωcm) | voltage at which abnormal electric discharge occurs (Vp-p) |
|---|---|---|---|
| No. 1 | 0.3 | $1 \times 10^9$ | higher than 4000 |
| No. 2 | 3.0 | $2 \times 10^6$ | 3500 |
| No. 3 | 1.0 | $5 \times 10^8$ | higher than 4000 |
| No. 4* | (the carbon black in base layer) | lower than $10^3$ | 2700 |
| No. 5 | 0.5 | $1 \times 10^9$ | higher than 4000 |
| No. 6 | 1.5 | $4 \times 10^8$ | higher than 4000 |
| No. 7 | 3.5 | $3 \times 10^6$ | 3600 |

*comparative example

It will be clearly understood from the above table that the level of the voltage at which the abnormal electric discharge occurs is considerably higher in the conductive rolls having the base layers which are formed of the ion-conductive materials (specimen Nos. 1–3 and 5–7) prepared as described above, and which have a volume resistivity of $10^6$–$10^9$ Ωcm. Thus, the conductive rolls constructed according to the present invention wherein the base layer includes the ion-conductive material are capable of effectively avoiding the occurrence of a poor or deficient image. On the other hand, the conductive roll produced as the comparative example whose base layer includes the electron-conductive material (specimen No. 4) suffers from low abnormal electric discharge voltage as indicated in TABLE 1, whereby an image reproduced by using the conductive roll whose base layer includes the electron-conductive material conventionally used is likely to be subject to lowered copy quality due to the abnormal electric discharge.

What is claimed is:

1. An electrically conductive roll comprising:

a center shaft having an outer circumferential surface;

a base layer formed on said outer circumferential surface of said center shaft and including an elastic material and an ion-conductive material, said base layer having a volume resistivity of $10^6$–$10^9$ Ωcm;

an electrode layer formed on an outer surface of said base layer and including a synthetic resin material and an electron-conductive material, said electrode layer having a volume resistivity of not more than $10^3$ Ωcm;

a resistance adjusting layer formed on an outer surface of said electrode layer; and a protective layer formed on an outer surface of said resistance adjusting layer.

2. An electrically conductive roll according to claim 1, wherein said elastic material of said base layer comprises at least one material selected from the group consisting of urethane rubber, epichlorohydrin rubber, acrylonitrile-butadiene rubber, and hydrogenated acrylonitrile-butadiene rubber.

3. An electrically conductive roll according to claim 2, wherein said epichlorohydrin rubber is epichlorohydrin-ethylene oxide copolymer rubber.

4. An electrically conductive roll according to claim 1, wherein said ion-conductive material of said base layer contains at least one of a quaternary ammonium salt having a structural charge specific anion, and/or perchlorate.

5. An electrically conductive roll according to claim 4, wherein said ion-conductive material is trimethyloctadecyl ammonium perchlorate.

6. An electrically conductive roll according to claim 4, wherein said base layer includes said ion-conductive material in an amount of 0.05–5 parts by weight per 100 parts by weight of said elastic material.

7. An electrically conductive roll according to claim 1, wherein said base layer has a thickness of 2–10 mm.

8. An electrically conductive roll according to claim 1, wherein said synthetic resin material of said electrode layer includes nylon.

9. An electrically conductive roll according to claim 1, wherein said electron-conductive material of said electrode layer includes at least one of a metal powder and/or a carbon black powder.

10. An electrically conductive roll according to claim 1, wherein said electrode layer has a thickness of 3–20 μm.

11. An electrically conductive roll according to claim 1, wherein said resistance adjusting layer consists of a material that is substantially the same elastic material and ion conductive material in said base layer.

12. An electrically conductive roll according to claim 1, wherein said resistance adjusting layer comprises a plurality of layers.

13. An electrically conductive roll according to claim 1, wherein said resistance adjusting layer has a thickness of 50–300 μm.

14. An electrically conductive roll according to claim 1, wherein said protective layer includes antimony oxide stannic oxide and nylon, wherein said protective layer has a volume resistivity of about $10^6$ Ωcm.

15. An electrically conductive roll according to claim 1, wherein said protective layer has a thickness of 3–30 μm.

* * * * *